(12) United States Patent
Suzuki et al.

(10) Patent No.: US 12,174,382 B2
(45) Date of Patent: Dec. 24, 2024

(54) HEAD-MOUNTED DISPLAY (71) Applicant: JVCKENWOOD Corporation, Yokohama (JP)

(72) Inventors: Tetsuji Suzuki, Yokohama (JP); Hideki Aiba, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 502 days.

(21) Appl. No.: 17/673,687

(22) Filed: Feb. 16, 2022

(65) Prior Publication Data

US 2022/0171197 A1 Jun. 2, 2022

Related U.S. Application Data

(63) Continuation of application No. PCT/JP2020/015693, filed on Apr. 7, 2020.

(30) Foreign Application Priority Data

Aug. 21, 2019 (JP) ................. 2019-151037

(51) Int. Cl.
*G02B 27/01* (2006.01)
*G02B 27/09* (2006.01)
*H04N 13/125* (2018.01)

(52) U.S. Cl.
CPC ..... *G02B 27/0172* (2013.01); *G02B 27/0977* (2013.01); *H04N 13/125* (2018.05); *G02B 2027/0118* (2013.01); *G02B 2027/013* (2013.01); *G02B 2027/0187* (2013.01)

(58) Field of Classification Search
None
See application file for complete search history.

(56) References Cited

U.S. PATENT DOCUMENTS

| 2012/0120498 A1 | 5/2012 | Harrison et al. |
| 2012/0120499 A1 | 5/2012 | Harrison et al. |
| 2016/0109712 A1 | 4/2016 | Harrison et al. |
| 2017/0123209 A1* | 5/2017 | Spitzer ............. G02F 1/133504 |
| 2017/0212352 A1 | 7/2017 | Cobb et al. |

FOREIGN PATENT DOCUMENTS

| CN | 101256285 A | 9/2008 |
| JP | H11-084308 A | 3/1999 |
| JP | 2013545130 A | 12/2013 |
| JP | 2014500518 A | 1/2014 |
| WO | 2015034453 A1 | 3/2015 |

OTHER PUBLICATIONS

International Search Report for related Application No. PCT/JP2020/015693, mailed Jul. 7, 2020, 3 pages.
Written Opinion for related Application No. PCT/JP2020/015693, mailed Jul. 7, 2020, 3 pages.

* cited by examiner

*Primary Examiner* — Bao-Luan Q Le
*Assistant Examiner* — Danell L Owens
(74) *Attorney, Agent, or Firm* — Procopio, Cory, Hargreaves & Savitch LLP (57) ABSTRACT

A head-mounted display according to an embodiment includes a combiner configured to combine display light for forming a display image and outside light from in front of a user wearing the head-mounted display, and a divider part arranged between a space in front of a left eye of the user and a space in front of a right eye, and configured to diffusely reflect the display light.

7 Claims, 11 Drawing Sheets

HEAD-MOUNTED DISPLAY

CROSS REFERENCE TO RELATED APPLICATION

This application is based upon and claims the benefit of priority from Japanese patent application No. 2019-151037 filed on Aug. 21, 2019, the disclosure of which is incorporated herein in its entirety by reference.

BACKGROUND

The present disclosure relates to a head-mounted display.

Patent Literature 1 (Published Japanese Translation of PCT International Publication for Patent Application, No. 2014-500518) discloses a head-mounted display in which a beam splitter having a curved surface is used. The head-mounted display of Patent Literature 1 includes a nasal ridge piece that separates fields of view of both eyes. The nasal ridge piece is a vertical bar or wall that separates two surfaces.

SUMMARY

As described above, the head-mounted display is provided with an optical system for guiding display light from a display element to each of left and right eyes. For example, the head-mounted display includes a left-eye display element, a left-eye optical system, a right-eye display element, and a right-eye optical system.

Figure 11:
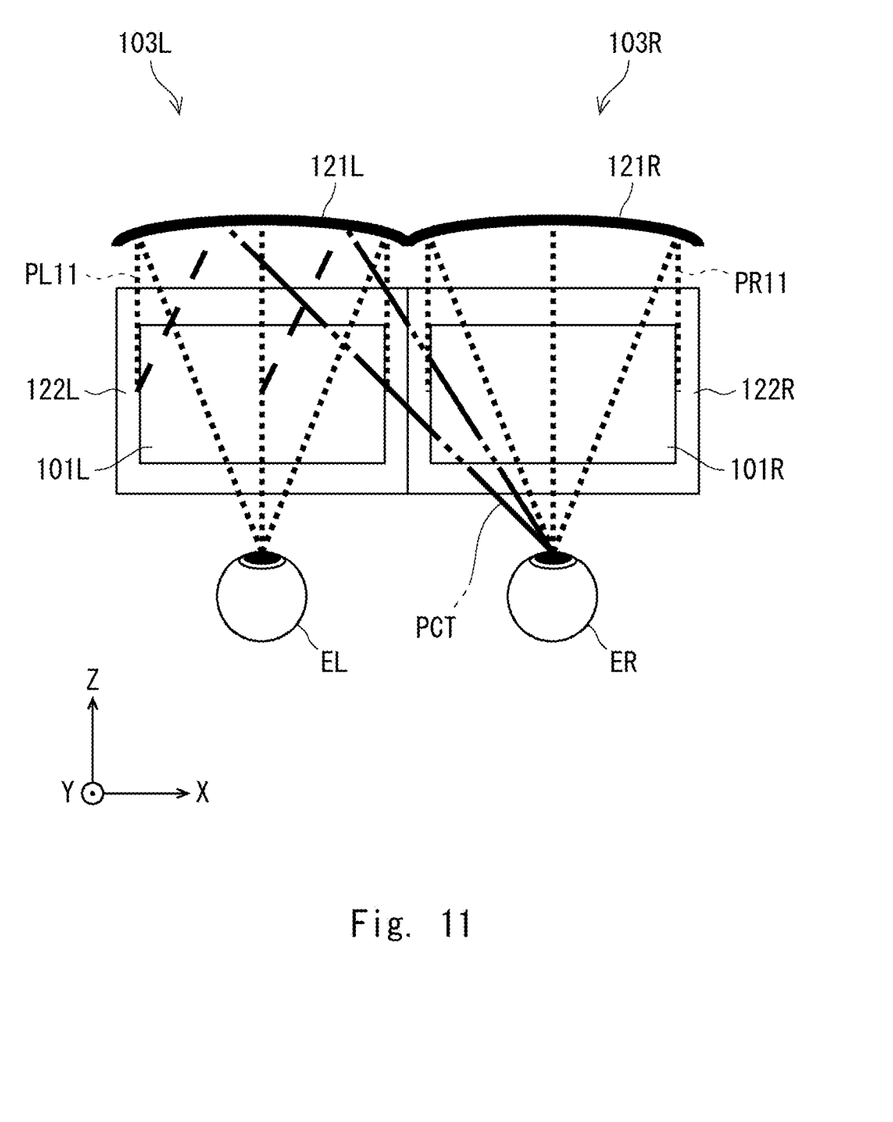
FIG. 11 is a view for describing crosstalk of display light.

However, the head-mounted display has a problem that a noise component called crosstalk light where display light from a right-eye display element enters the left eye, for example, occurs, which causes degradation of display quality. Particularly, the effect of crosstalk increases in a case where the optical system is enlarged in order to increase the viewing angle in the left-right direction. The crosstalk means that display light from the left or right display element each enters the eye different from the intended eye. This is described with reference to FIG. 11. FIG. 11 is a top view schematically showing the structure of a display element and an optical system.

A beam splitter 122L and a combiner 121L are arranged in front of the left eye EL. Likewise, a beam splitter 122R and a combiner 121R are arranged in front of the right eye ER. Display light PL11 from a left-eye display element 101L arranged above the beam splitter 122L is reflected by the beam splitter 122L and enters the combiner 121L. The display light PL11 that has been reflected by the combiner 121L passes through the beam splitter 1221L and enters the left eye EL.

However, part of the display light PL11 that has been reflected by the combiner 121L enters the right eye ER as crosstalk light PCT. Likewise, part of display light PR11 from a right-eye display element 101R enters the left eye EL as crosstalk light, though not shown in FIG. 11. When part of the display light PL11 or PR11 from the left or right display element enters the eye on the opposite side as crosstalk light PCT, it acts as a noise component of a display image. This reduces contrast and produces a double image or the like, which may cause degradation of display quality. Patent Literature 1 reduces crosstalk, but has a problem that high display quality cannot be obtained as the vertical bar or wall that separates the two surfaces are emphasized.

A head-mounted display according to an embodiment includes a reflective member arranged in front of a user, and configured to reflect display light for forming a display image toward the user, and a divider part arranged between a space in front of a left eye of the user and a space in front of a right eye, and configured to diffusely reflect the display light.

DETAILED DESCRIPTION

Specific embodiments of the present invention are described hereinafter in detail with reference to the drawings. The present disclosure, however, is not limited to the below-descried embodiments. The following description and the attached drawings are appropriately simplified to clarify the explanation.

First Embodiment

Figure 1:
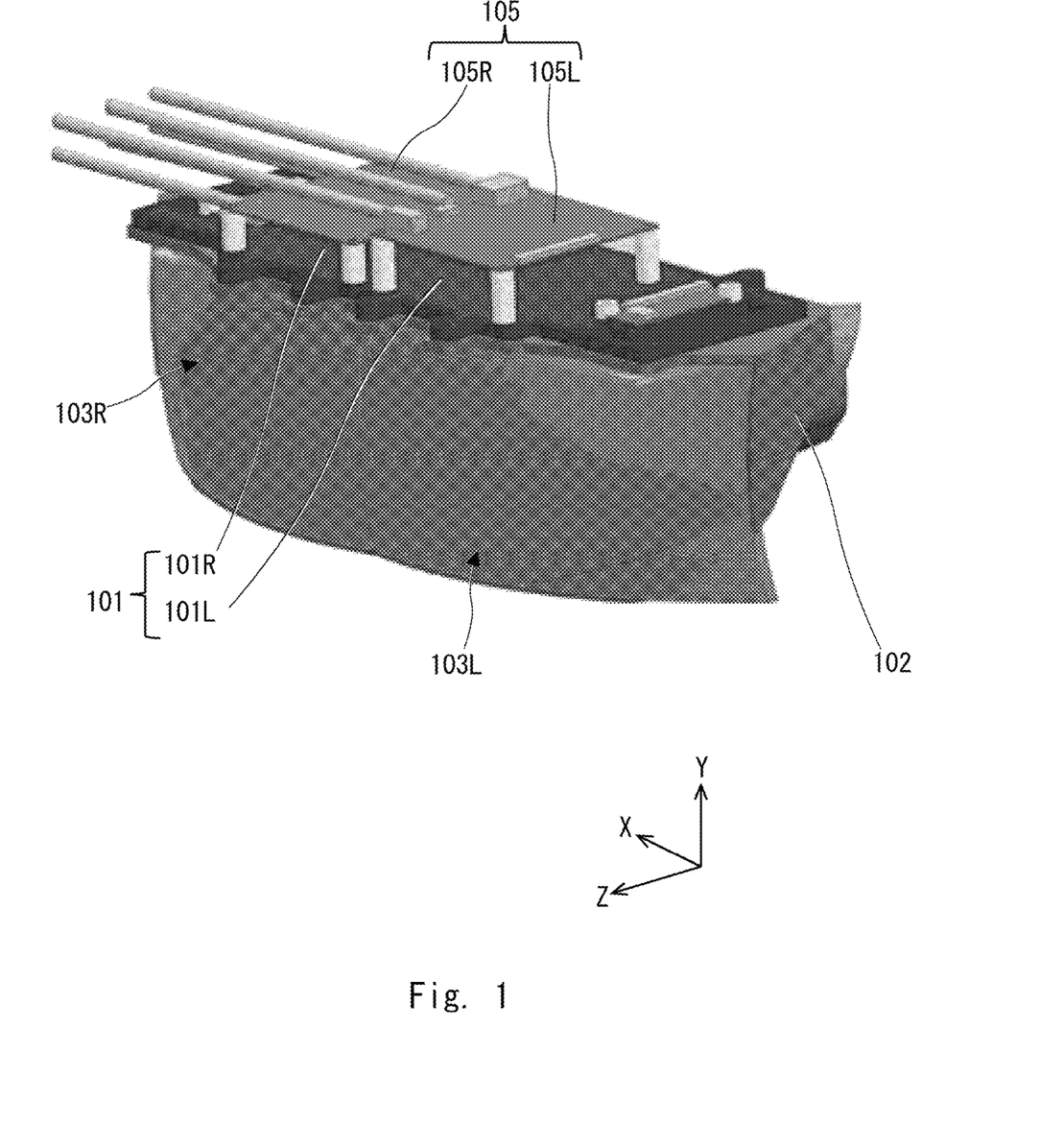
FIG. 1 is a view showing a part of the structure of a head-mounted display according to an embodiment.
Figure 2:
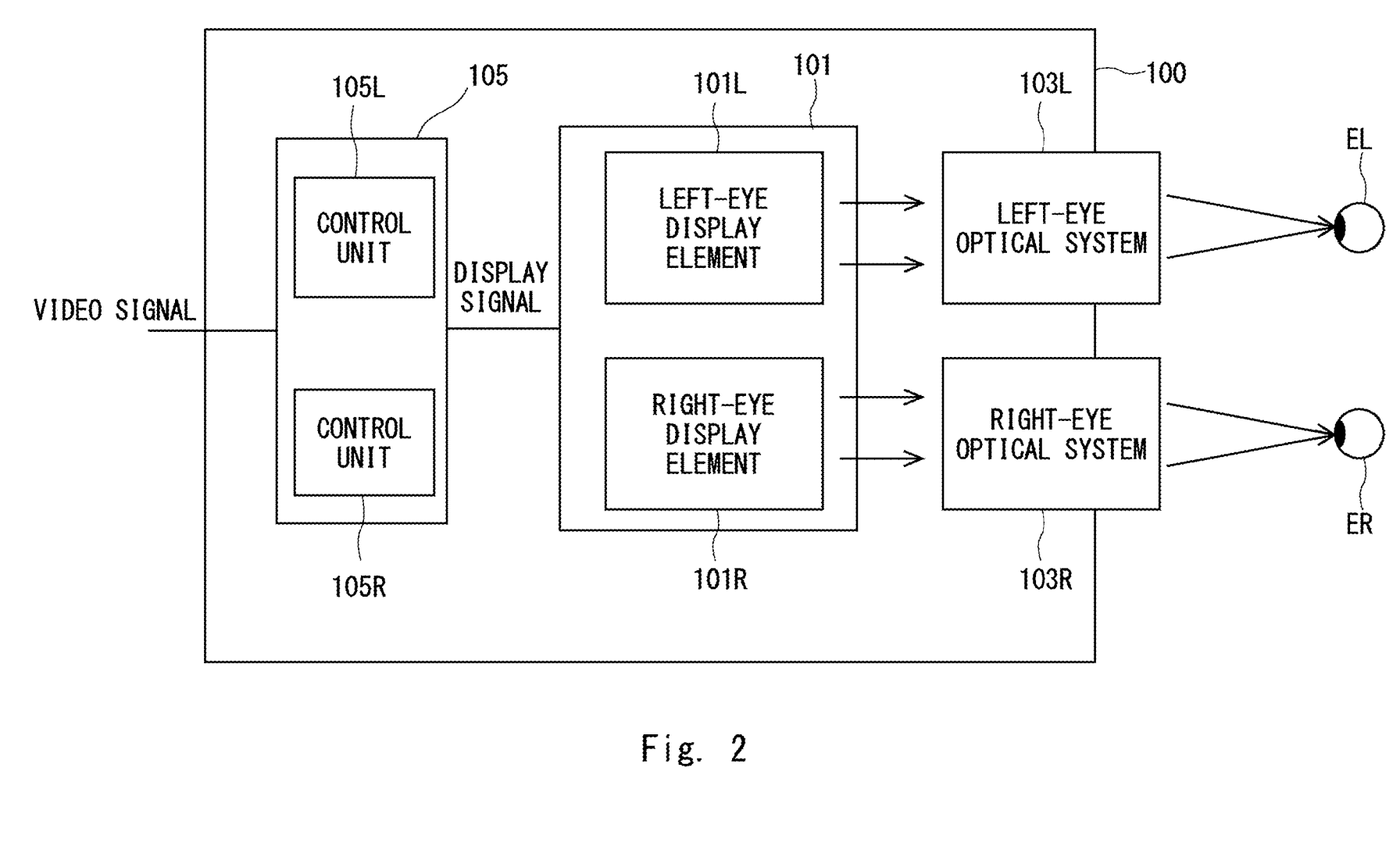
FIG. 2 is a view showing functional blocks of the head-mounted display according to the embodiment.

A head-mounted display and a display method of the same according to an embodiment are described hereinafter with reference to the drawings. FIG. 1 is a perspective view schematically showing a part of a structure of a head-mounted display 100. FIG. 2 is a view showing some of functional blocks of the head-mounted display 100. FIGS. 1 and 2 mainly show a structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be a VR (Virtual Reality) head-mounted display, an AR (Augmented Reality) head-mounted display, or an MR (Mixed Reality) head-mounted display, for example. Note that the head-mounted display 100 is an optical see-through head-mounted display used for AR or MR in this embodiment, but may be a non-transmissive head-mounted display.

To clarify the explanation, an XYZ three-dimensional Cartesian coordinate system is used in the following description. As seen from a user, the front-back direction (depth direction) is Z direction, the left-right direction (horizontal direction) is X direction, and the up-down direction (vertical direction) is Y direction. The front direction is +Z direction, the back direction is −Z direction, the right direction is +X direction, the left direction is −X direction, the up direction is +Y direction, and the down direction is −Y direction.

The user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has goggles or glasses shape, and it is worn on the head of the user by a head band, which is not shown, or the like. The display element unit 101, the left-eye optical system 103L, the right-eye optical system 103R, the control unit 105L, and the control unit 105R are mounted on the frame 102. Note that, although the binocular head-mounted display 100 is shown in FIG. 1, the head-mounted display may be a glasses-shaped non-immersive head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display such as a liquid crystal monitor or an organic EL (Electro-Luminescence) monitor. The left-eye display element 101L and the right-eye display element 101R may be curve-shaped displays. Each of the left-eye display element 101L and the right-eye display element 101R includes a plurality of pixels arranged in an array. The array arrangement is not limited to two-dimensional matrix arrangement, and it may be PenTile arrangement or the like. The left-eye display element 101L is arranged on the left side (−X side) of the right-eye display element 101R.

The control unit 105 is provided above (on the +Y side) the display element unit 101. A video signal, a control signal, and power from the outside are supplied to the control unit 105. For example, a video signal and the like are input to the control unit 105 by wired connection such as HDMI (registered trademark) or wireless connection such as WiFi (registered trademark) or BlueTooth (registered trademark). The head-mounted display 100 may include a video generation unit (not shown) that generates a video signal, and a video signal or the like generated by the video generation unit may be input to the control unit 105.

The control unit 105L and the control unit 105R include hardware resources such as a CPU (Central Processing Unit), a memory and the like, and operates according to a computer program stored in the memory. Further, each of the control unit 105L and the control unit 105R includes a display driving circuit or the like. The control unit 105L generates a display signal of a left-eye image on the basis of a video signal, a control signal and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements, and it may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105 and the like are not necessarily fixed to the frame 102, and they may be mounted detachable from the frame 102. For example, the display element unit 101, the control unit 105 and the like may be implemented by mounting a smartphone or a tablet computer on the frame 102. In this case, an application program (app) that generates display images for the head-mounted display is previously installed into the smartphone or the like.

The left-eye optical system 103L guides the display light that is output from the left-eye display element 101L to the left eye EL of the user as a left-eye image. The right-eye optical system 103R guides the display light that is output from the right-eye display element 101R to the right eye ER of the user as a right-eye image. The left-eye optical system 103L is arranged on the left side (−X side) of the right-eye optical system 103R. The left-eye optical system 103L is arranged in front (+Z direction) of the left eye EL of the user. The right-eye optical system 103R is arranged in front (+Z direction) of the right eye ER of the user. The user is able to see a virtual image of a display image generated by the display element unit 101 in the front (in the +Z direction).

As described above, the head-mounted display 100 according to this embodiment may either be a semitransparent or non-transmissive head-mounted display. Note that the description herein is provided assuming that the head-mounted display 100 is a semitransparent head-mounted display. Thus, the left-eye optical system 103L and the right-eye optical system 103R include a combiner, which is described later. In the semitransparent head-mounted display 100, display light from the display element unit 101 and outside light enter the left eye EL and the right eye ER. Thus, the user is able to see a superimposed image on which a display image is superimposed on a view in the front (in the +Z direction).

Figure 3:
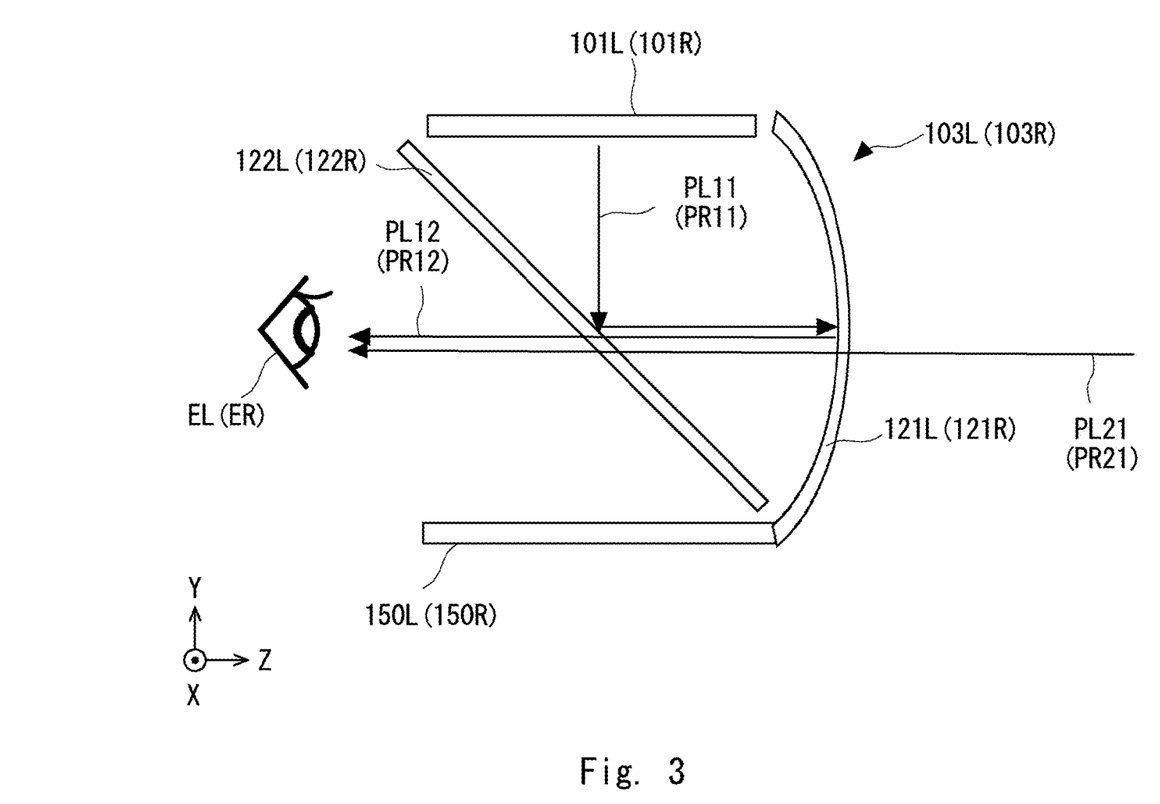
FIG. 3 is a view for describing display light and outside light in an optical system of a head-mounted display.

An example of the left-eye optical system 103L and the right-eye optical system 103R (which are collectively referred to simply as an optical system below) is described hereinafter. FIG. 3 is a side view schematically showing the optical system. Note that the left-eye optical system 103L and the right-eye optical system 103R have the same structure, and therefore only the left-eye optical system 103L is described with reference to FIG. 3.

The left-eye optical system 103L includes a combiner 121L, a beam splitter 122L, and a light shielding part 150L. The combiner 121L, the beam splitter 122L, and the light shielding part 150L are fixed to the frame 102 shown in FIG. 1.

The combiner 121L is a concave mirror, and the beam splitter 122L is a plane mirror. The combiner 121L and the beam splitter 122L are beam splitters such as half-mirrors, and reflect part of incident light and transmit part of incident light. When it is assumed that the percentage of reflection and the percentage of transmission in the combiner 121L are equal, the combiner 121L transmits approximately half of the amount of incident light, and reflects the remaining half. Likewise, when it is assumed that the percentage of reflection and the percentage of transmission in the beam splitter 122L are equal, the beam splitter 122L transmits approximately half of the amount of incident light, and reflects the remaining half. The combiner 121L and the beam splitter 122L may increase the percentage of reflection and decrease the percentage of transmission, or may decrease the percentage of reflection and increase the percentage of transmission.

The combiner 121L and the beam splitter 122L are arranged in front (+Z direction) of the user's left eye EL. Further, the combiner 121L is arranged in front (+Z direction) of the beam splitter 122L.

The left-eye display element 101L is arranged above (in the +Y direction) the beam splitter 122L. The left-eye display element 101L outputs the display light PL11 for forming a display image. Thus, the left-eye display element 101L is arranged diagonally above in front of the left eye EL.

The light shielding part 150L is arranged below (in the −Y direction) the beam splitter 122L. Thus, the light shielding part 150L is arranged diagonally below in front of the left eye EL. The light shielding part 150L is provided to shield a field of vision in the diagonally lower front. The light shielding part 150L is formed of a black material or the like that absorbs light. A lower window for viewing the diagonally lower front may be provided instead of the light shielding part 150L.

The display light PL11 from the left-eye display element 101L is described hereinafter. The display surface of the left-eye display element 101L faces downward (in the −Y direction). Thus, the display light PL11 from the left-eye display element 101L is output downward (in the −Y direction). The beam splitter 122L is arranged at an angle below (in the −Y direction) the left-eye display element 101L. The display light PL11 from the left-eye display element 101L enters the beam splitter 122L. The beam splitter 122L reflects part of the display light PL11. The remaining part of the display light PL11 that has passed through the beam splitter 122L is absorbed by the light shielding part 150L.

The display light PL11 that has been reflected by the beam splitter 1221L is reflected forward (in the +Z direction). Then, the display light PL11 enters the combiner 121L. The combiner 121L reflects part of the display light PL11 backward (in the −Z direction). The display light PL11 that has been reflected by the combiner 121L is referred to as display light PL12. Further, the combiner 121L is a concave mirror, and reflects the display light PL11 so as to focus the display light PL12 toward the left eye EL. The display light PL12 that has been reflected by the combiner 121L enters the beam splitter 122L. The beam splitter 122L transmits part of the display light PL12.

The display light PL12 that has passed through the beam splitter 122L enters the left eye EL. In this manner, the left-eye optical system 1031L guides the display light PL11 from the left-eye display element 101L to the user's left eye EL. The optical system can display the virtual image in front (in the +Z direction) of the user. Further, since a concave mirror is used as the combiner 121L, the display image is displayed in a larger scale.

The outside light PL21 from the front (+Z direction) of the user is described hereinafter. Part of the outside light PL21 passes through the combiner 121L. The outside light PL21 that has passed through the combiner 121L enters the beam splitter 122L. The beam splitter 122L transmits part of the outside light PL21. The outside light PL21 that has passed through the beam splitter 122L enters the left eye EL.

Since the head-mounted display 100 is semitransparent, the combiner 121L combines the outside light PL21 from the front (+Z direction) and the display light PL11 from the left-eye display element 101L. The right-eye optical system 103R is the same as the left-eye optical system 103L. The combiner 121R combines outside light PR21 from the front (in the +Z direction) and the display light PR11 from the right-eye display element 101R. By arranging the combiners 121L and 121R in front (in the +Z direction) of the user, the head-mounted display 100 functions as an optical see-through display. A display image is superimposed on a view in front (in the +Z direction) of the user. The user is thereby able to see a view on which the display image is superimposed.

Figure 4:
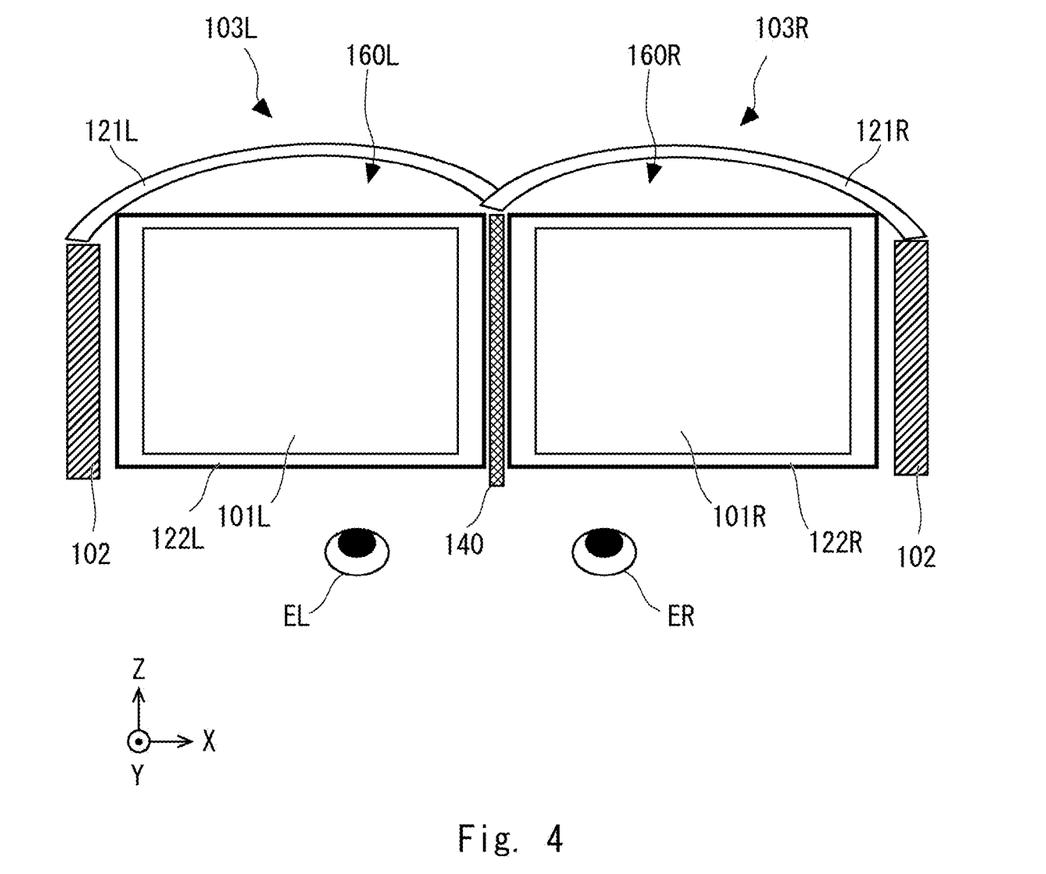
FIG. 4 is a top view schematically showing the structure of an optical system of a head-mounted display according to a first embodiment.
Figure 5:
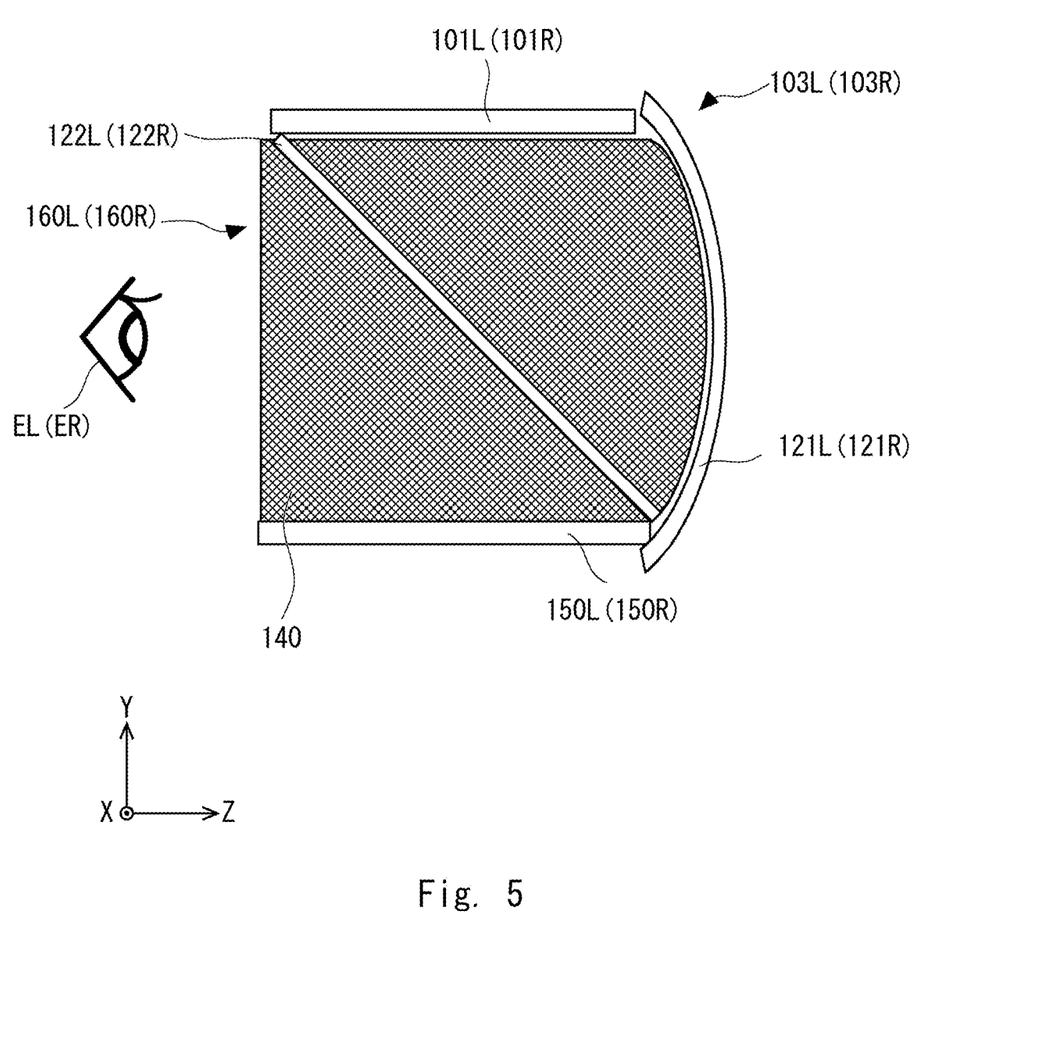
FIG. 5 is a side view schematically showing the structure of the optical system of the head-mounted display according to the first embodiment.

The structure for reducing crosstalk is described hereinafter with reference to FIGS. 4 and 5. FIG. 4 is a top view schematically showing the optical system, and FIG. 5 is a side sectional view. As shown in FIGS. 4 and 5, a divider part 140 is provided between the left-eye optical system 103L and the right-eye optical system 103R.

The divider part 140 is arranged between a space in front (in the +Z direction) of the left eye EL. (which is referred to as the left front space 160L below) and a space in front (in the +Z direction) of the right eye ER (which is referred to as the right front space 160R below). The left front space 1601L and the right front space 160R are divided by the divider part 140. The divider part 140 defines the boundary between the left front space 160L and the right front space 160R in the X direction.

Note that the left front space 160L is a space defined by the combiner 121L, the left-eye display element 101L, the light shielding part 150L, the divider part 140, the frame 102 (see FIG. 1 together), and the user's face. Thus, the front side (in the +Z direction) of the left front space 160L faces the combiner 121L, and the rear side (in the −Z direction) faces the user's face. The upper side (in the +Y direction) of the left front space 160L faces the left-eye display element 101L, and the lower side (in the −Y direction) faces the light shielding part 150L. The right side (in the +X direction) of the left front space 160L faces the divider part 140, and the left side (in the −X direction) faces the frame 102.

Likewise, the right front space 160R is a space defined by the combiner 121R, the right-eye display element 101R, the light shielding part 150R, the divider part 140, the frame 102 (see FIG. 1 together), and the user's face. Thus, the front side (in the +Z direction) of the right front space 160R faces the combiner 121R, and the rear side (in the −Z direction) faces the user's face. The upper side (in the +Y direction) of the right front space 160R faces the right-eye display element 101R, and the lower side (in the −Y direction) faces the light shielding part 150R. The right side (in the +X direction) of the right front space 160R faces the frame 102, and the left side (in the −X direction) faces the divider part 140.

The divider part 140 is arranged in front of and behind the beam splitters 122L and 122R. To be specific, the divider part 140 is arranged between the beam splitters 122L and 122R from in front (in the +Z direction) of the beam splitters 122L and 122R to behind (in the −Z direction) the beam splitters 122L and 122R. The divider part 140 is a diffuse reflection plate, which diffusely reflects visible light. Diffuse reflection means a diffuse reflection component of light reflection excluding specular reflection. The divider part 140 diffusely reflects incident outside light and display light in various directions. Note that the divider part 140 may not divide the left front space 160L and the right front space 160R completely. In other words, the left front space 160L and the right front space 160R may be connected partially.

The divider part 140 blocks the display light PL11 and PL12 from the left-eye display element 101L from entering the right eye ER. The divider part 140 also blocks the display light PR11 from the right-eye display element 101R and the display light PR12 which is the display light PR11 that has been reflected by the combiner 121R from entering the left eye EL. In other words, the divider part 140 blocks the crosstalk light PCT shown in FIG. 11. This reduces crosstalk, and improves display quality.

Further, since the divider part 140 is a diffuse reflection plate, part of light that has entered the divider part 140 reaches the left eye EL or the right eye ER. For example, part of the outside light PL21 that has passed through the combiner 121L is diffusely reflected by the divider part 140 and enters the left eye EL. Further, part of the display light PL11 and PL12 from the left-eye display element 101L is diffusely reflected by the divider part 140 and enters the left eye EL. Part of the outside light PR21 that has passed through the combiner 121R is diffusely reflected by the divider part 140 and enters the right eye ER. Further, part of the display light PR11 and PR12 from the right-eye display element 101R is diffusely reflected by the divider part 140 and enters the right eye ER.

Thus, this embodiment prevents the divider part 140 from being seen as a black shadow by the user, as compared with a case in which the divider part 140 is a non-diffuse reflection plate. In other words, the divider part 140 diffusely reflects light in such a way that the divider part 140 does not stand out. Note that the non-diffuse reflection plate refers to a resin plate colored black, for example.

Diffuse reflectance of the divider part 140 is adjusted in such a way that the divider part 140 does not become excessively bright or excessively dark to stand out. The diffuse reflectance refers to the percentage of the amount of diffusely reflected light in the amount of incident light, and represents color brightness. The diffuse reflectance is adjusted by a color that colors the divider part 140 and treatment to be performed on the surface of the divider part 140. The diffuse reflectance of the divider part 140 preferably falls within a range that is not close to 0% at which the divider part 140 becomes excessively bright and that is not close to 100% at which the divider part 140 becomes excessively dark. This allows the user to naturally see the display image, which improves display quality.

In order that the divider part 140 has appropriate diffuse reflectance so as not to stand out, a resin plate colored gray or the like is used for the divider part 140, for example. Gray refers to colors except white whose mixing ratio is 100% white and black whose mixing ratio is 100% black among achromatic colors which are mixed colors of white and black. Gray also includes a color whose mixing ratio is 1% white and 99% black, and a color whose mixing ratio is 99% white and 1% black. In other words, the divider part 140 is colored by a color which is neither white nor black.

Alternatively, by forming the divider part 140 with diffuse reflection treatment performed on its surface, the divider part 140 has appropriate diffuse reflectance so as not to stand out. The diffuse reflection treatment refers to rubbing a resin surface with sandpaper or the like to roughen the resin surface so as to have fine irregularities, for example. Herein, the surface of the divider part 140 refers to the surface that faces the left front space 160L and the surface that faces the right front space 160R.

Irrespective of brightness or darkness of the divider part 140, the divider part 140 may have substantially the same color as the user's skin color such as the user's skin tone so as not to stand out. The user's skin color indicates all colors that may generally be recognized as skin tones, and can be changed as appropriate according to the skin tone of a race. The user's skin color may be a color that falls within a range in which $0.375 \leq x \leq 0.400$ and $0.340 \leq y \leq 0.360$ held on the CIE chromaticity diagram, for example. The skin color in a case where the user is the Caucasoid race may be a color that falls within a range in which $0.375 \leq x \leq 0.385$ and $0.340 \leq y \leq 0.345$ held on the CIE chromaticity diagram. The skin color in a case where the user is the Mongoloid or Negroid race may be a color that falls within a range in which $0.390 \leq x \leq 0.400$ and $0.350 \leq y \leq 0.360$ held on the CIE chromaticity diagram. When the divider part 140 has the same type of color as the skin color, the divider part 140 blends in with the nose and is seen like part of the nose, which improves display quality.

Since the divider part 140 is a diffuse reflection plate, the user is able to see a display image without the divider part 140 being emphasized. This increases display quality. Further, since display light that has entered the divider part 140 is also diffusely reflected, part of a display image is prevented from being formed by display light that has been reflected by the divider part 140. This increases display quality.

Note that the divider part 140 is formed of a thin plate whose thickness direction is the left-right direction (the X direction). The shape of the divider part 140 on the Y-Z plane is determined in accordance with the shape of the left front space 160L and the right front space 160R. Note that the end sides of the diffuse reflection plate to be the divider part 140 are shaped along the display element unit 101, the light shielding parts 1501, 150R, and the combiners 121L, 121R. As shown in FIG. 5, an end side of the divider part 140 in the front (in the +Z direction) is formed along the curves of the combiners 121L and 121R. In other words, the end side of the divider part 140 in the front (in the +Z direction) is formed as an arc. This allows the left front space 160L and the right front space 160R to be divided properly, which allows crosstalk to be reduced effectively.

Second Embodiment

Figure 6:
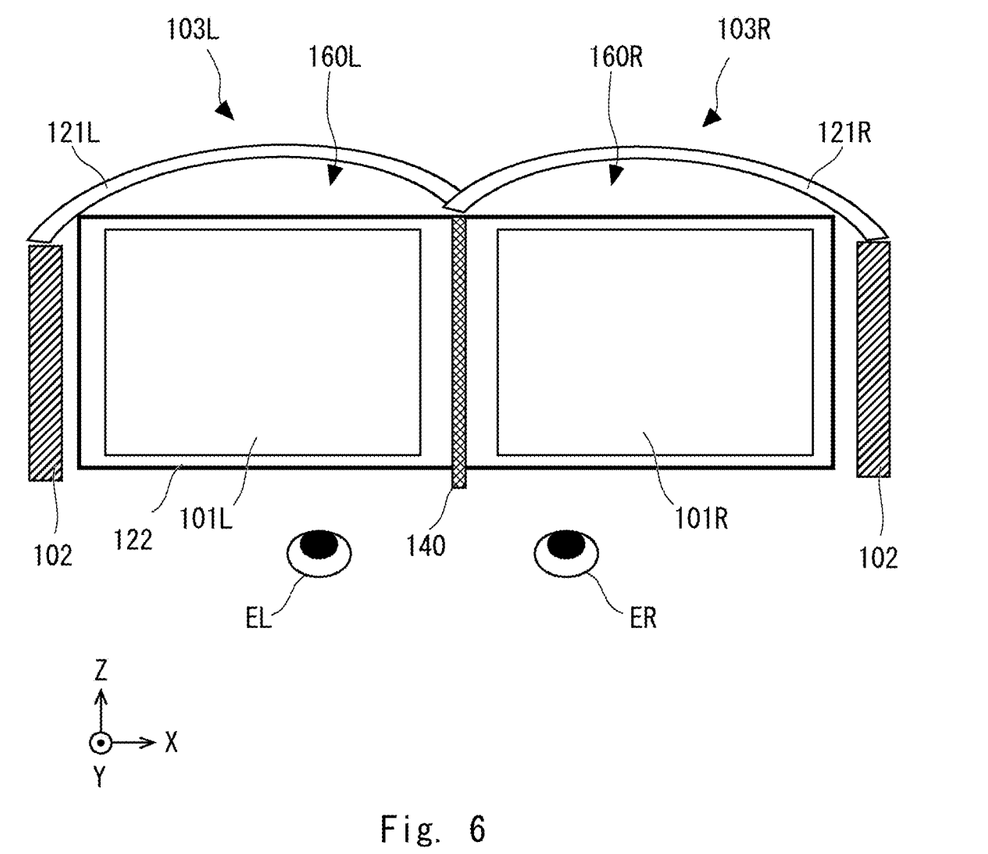
FIG. 6 is a top view schematically showing the structure of an optical system of a head-mounted display according to a second embodiment.
Figure 7:
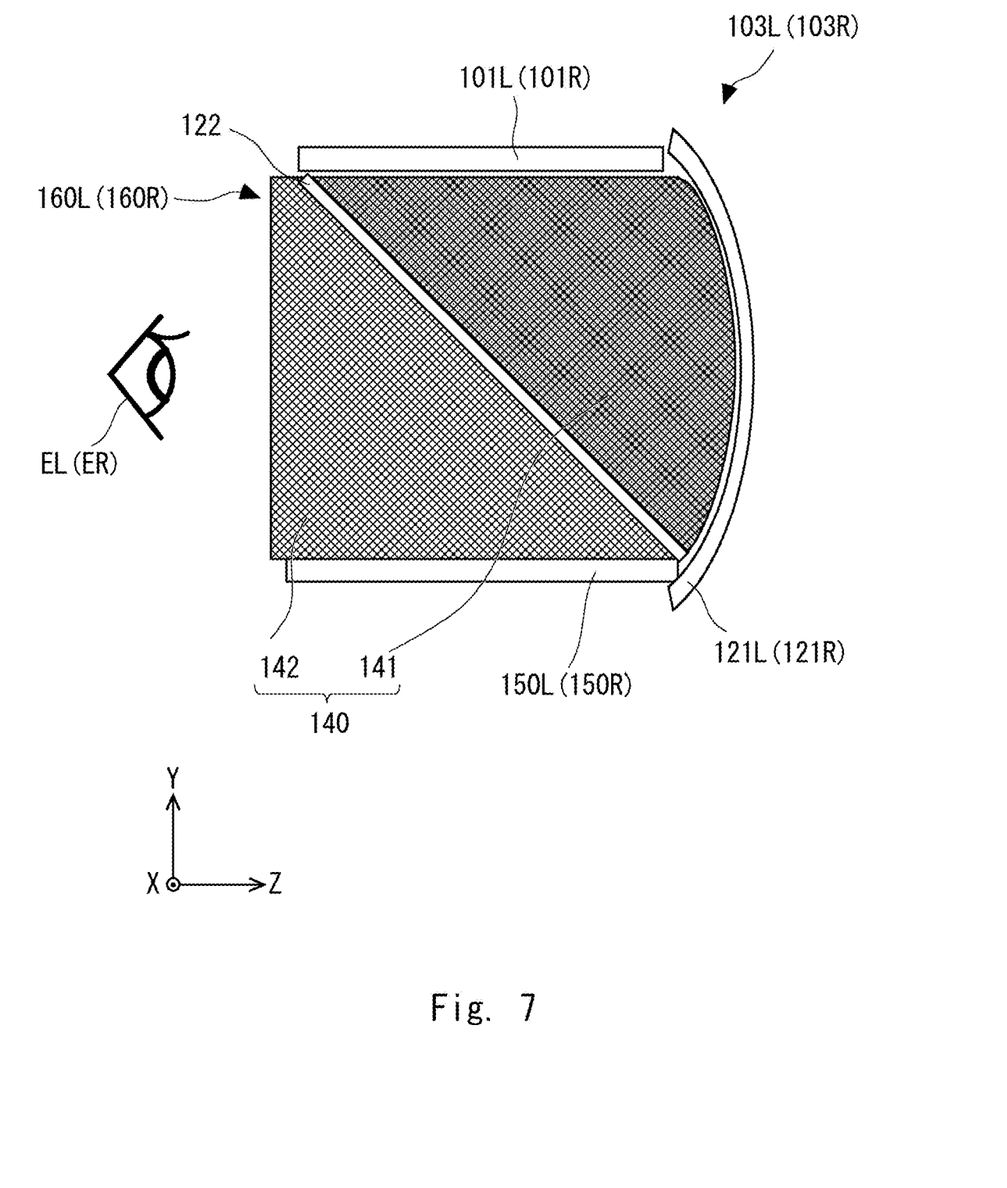
FIG. 7 is a side view schematically showing the structure of the optical system of the head-mounted display according to the second embodiment.

The head-mounted display 100 according to this embodiment is described with reference to FIGS. 6 and 7. In this embodiment, left and right beam splitters 122 are formed integrally. In other words, the beam splitter 122L and the beam splitter 122R are implemented by a single beam splitter 122. The beam splitter 122 is arranged across the left front space 160L and the right front space 160R.

The left-eye optical system 103L and the right-eye optical system 103R share the beam splitter 122. This prevents misalignment of virtual images between the left-eye optical system 103L and the right-eye optical system 103R. In other words, when the beam splitter 122L and the beam splitter 122R are arranged at an angle in the structure in which the beam splitter 122L and the beam splitter 122R are provided separately as in the first embodiment, left and right virtual images are displayed in a manner misaligned from each other in the up-down direction (the Y direction). Since this embodiment prevents virtual images from being misaligned in the up-down direction (the Y direction), high display quality is obtained.

The left-eye optical system 103L and the right-eye optical system 103R share the single beam splitter 122. Thus, the divider part 140 cannot be arranged between the left and right beam splitters 122L and 122R as in the first embodiment. In this embodiment, the divider part 140 is implemented by two divider plates 141 and 142. The divider part 140 is implemented by the single divider plate in the first embodiment, whereas in the second embodiment, the divider part 140 is implemented by the two divider plates 141 and 142. The divider plate 141 is arranged in front (in the +Z direction) of the beam splitter 122. The divider plate 142 is arranged behind (in the −Z direction) the beam splitter 122.

The divider plates 141 and 142 are diffuse reflection plates, each of which diffusely reflects light. The divider plates 141 and 142 are formed of resin plates colored gray or colored by a skin color. Further, the divider plates 141 and 142 are formed with diffuse reflection treatment performed on their surfaces. Herein, the surfaces of the divider plate 141 and the divider plate 142 refer to the surface that faces the left front space 160L and the surface that faces the right front space 160R. Since the divider part 140 can divide the left front space 160L and the right front space 160R, crosstalk is reduced. Effects similar to those of the first embodiment are thereby obtained.

Figure 8:
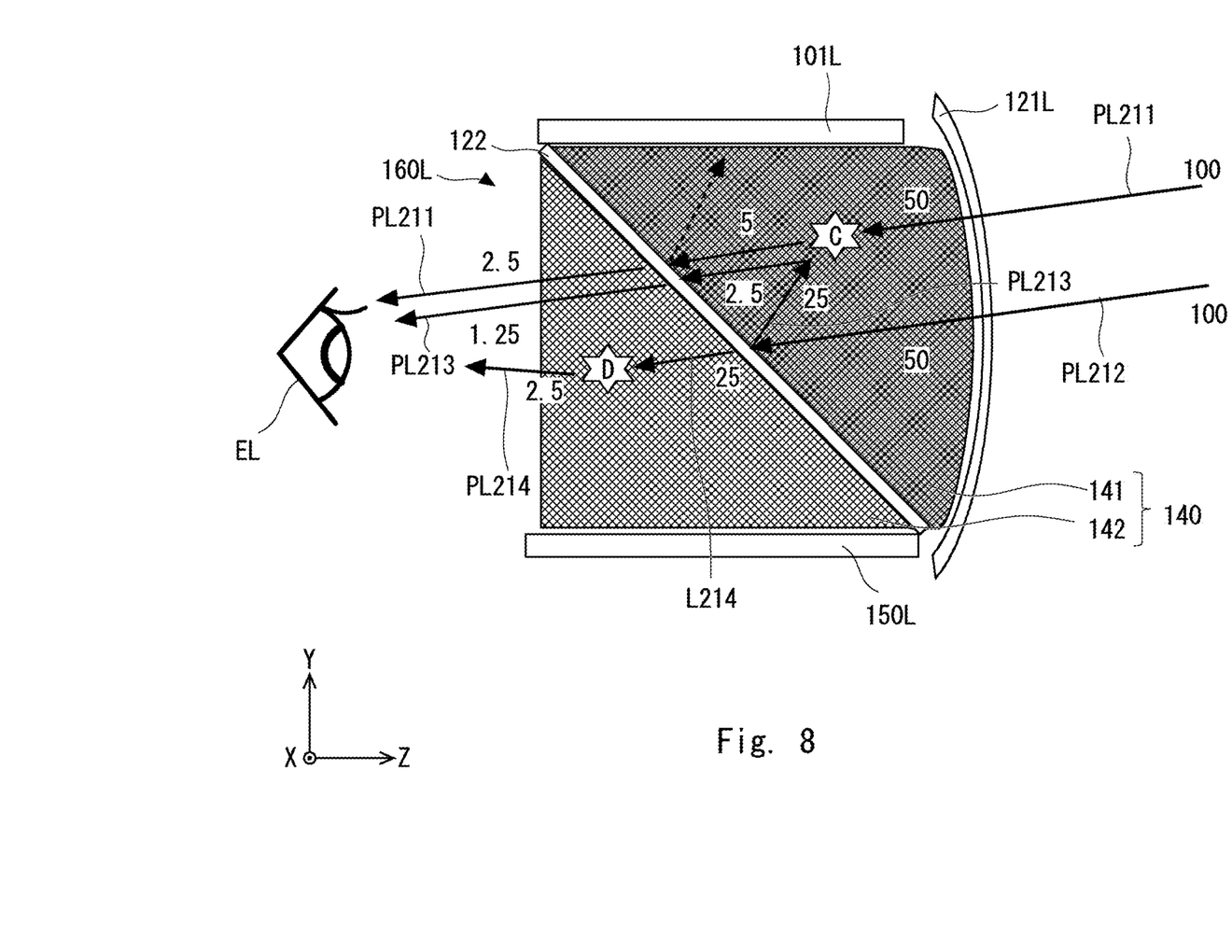
FIG. 8 is a view for describing outside light that enters an eye.

Further, the divider plate 141 and the divider plate 142 are different in values of diffuse reflectance in this embodiment. This is described with reference to FIG. 8. FIG. 8 is a view for describing the amount of outside light diffusely reflected by the divider plates 141 and 142. Note that the left-eye optical system 103L and the right-eye optical system 103R have the same structure, and therefore only the left-eye optical system 103L is described hereinafter.

Description is provided with reference to FIG. 8 assuming that approximately 10% of outside light that has been diffusely reflected by the divider plates 141 and 142 travels to the left eye EL. In other words, it is supposed that approximately 1/10 of outside light that has entered the divider plates 141 and 142 is reflected toward the left eye EL at either a location C on the divider plate 141 or a location D on the divider plate 142. It is also supposed that the transmittance of the combiner 121L and the beam splitter 122 is 50% and the reflectance is 50%.

The outside light PL211 to be diffusely reflected by the divider plate 141 before entering the beam splitter 122 is described first. The outside light PL211 that has passed through the combiner 121L enters the divider plate 141 at the location C. Herein, when it is assumed that the amount of the outside light PL211 before entering the combiner 121L is 100, the amount of the outside light PL211 that has passed through the combiner 121L is 50 (=100×0.5).

Then, part of the outside light PL211 that has been diffused at the location C passes through the beam splitter 122 and enters the left eye EL. The amount of the outside light PL211 that has been diffused at the location C and travels toward the left eye EL is 5 (=50×0.1). Further, the amount of the outside light PL211 that passes through the beam splitter 122 and reaches the left eye EL is 2.5 (=5×0.5).

The outside light PL212 to be diffusely reflected after entering the beam splitter 122 is described hereinafter. The outside light PL212 enters the beam splitter 122 after passing through the combiner 121L. Thus, half of the outside light PL212 that has passed through the combiner 121L passes through the beam splitter 122, and the remaining half is reflected by the beam splitter 122. Of the outside light PL212, light that has been reflected by the beam splitter 122 is referred to as outside light PL213. Of the outside light PL212, light that has passed through the beam splitter 122 is referred to as outside light PL214.

When it is assumed that the amount of the outside light PL212 before entering the combiner 121L is 100, the amount of the outside light PL212 immediately after passing through the combiner 121L is 50 (=100×0.5). Further, the amount of the outside light PL213 immediately after being reflected by the beam splitter 122 is 25 (=50×0.5). The amount of the outside light PL214 immediately after passing through the beam splitter 122 is 25 (=50×0.5).

Then, the outside light PL213 is diffusely reflected by the divider plate 141 at the location C. Part of the outside light PL213 that has been diffusely reflected by the divider plate 141 travels toward the left eye EL. The amount of the outside light PL213 that has been diffusely reflected by the divider plate 141 and travels toward the left eye EL is 2.5 (=25×0.1). Further, the outside light PL213 enters the left eye EL after passing through the beam splitter 122. Thus, the amount of the outside light PL213 that reaches the left eye EL is 1.25 (=2.5×0.5).

The outside light PL214 is diffusely reflected by the divider plate 142 at the location D. Part of the outside light PL214 that has been diffusely reflected by the divider plate 142 travels toward the left eye EL. The amount of the outside light PL214 that has been diffusely reflected by the divider plate 142 and travels toward the left eye EL is 2.5 (=25×0.1). Thus, the amount of the outside light PL214 that reaches the left eye EL is 2.5.

Therefore, the total amount of the outside light PL211 and the outside light PL213 that have been diffusely reflected at the location C is 3.75 (=2.5+1.25). On the other hand, the amount of the outside light PL214 that has been diffusely reflected at the location D is 2.5. A difference arises in brightness seen by the user between the location C and the location D. The location C is seen brighter than the location D by the user. In other words, the divider plate 141 is seen brighter than the divider plate 142 by the user.

Thus, in this embodiment, the divider plate 141 and the divider plate 142 have different values of diffuse reflectance. To be specific, the diffuse reflectance of the divider plate 142 is made higher than the diffuse reflectance of the divider plate 141. This reduces the difference in brightness between the divider plate 141 and the divider plate 142, which allows higher display quality to be obtained. In other words, by adjusting the divider plate 141 and the divider plate 142 in diffuse reflectance, non-uniformity of brightness of the divider part 140 is corrected. This allows higher display quality to be obtained.

Note that the divider plate 141 is colored by a color darker than that of the divider plate 142. This allows the light diffuse reflectance of the divider plate 142 to be higher than the light diffuse reflectance of the divider plate 141. By setting the diffuse reflectance of the divider plate 142 at approximately 1.5 times the diffuse reflectance of the divider plate 141, the user is able to see the divider plate 141 at a brightness of the same degree as the divider plate 142. Obviously, the diffuse reflectance of the divider plate 142 may be more than or equal to, or less than or equal to 1.5 times the diffuse reflectance of the divider plate 141.

The diffuse reflectance is made different by coloring the divider plate 141 and the divider plate 142 by colors of the same type that are different only in grayscale. In a case where the divider plate 141 and the divider plate 142 are gray, the mixing ratio of white and black is changed to change the grayscale, thereby making the diffuse reflectance different. In a case of obtaining dark gray having low diffuse reflectance, a color having an increased ratio of black is used, and in a case of obtaining light gray having high diffuse reflectance, a color having an increased ratio of white is used.

The diffuse reflectance may be made different by subjecting the surfaces of the divider plate 141 and the divider plate 142 to different diffuse reflection treatments between the front side (in the +Z direction) and back side (in the −Z direction) of the beam splitter 122. One of the divider plate 141 and the divider plate 142 is subjected to diffuse reflection treatment for obtaining high diffuse reflectance, and the other is subjected to diffuse reflection treatment for obtaining low diffuse reflectance. In a case of increasing the diffuse reflectance, the pitch of irregularities is narrowed, and in a case of decreasing the diffuse reflectance, the pitch of irregularities is widened.

In a case where the divider plate 141 and the divider plate 142 have skin tones, the diffuse reflectance is made different by changing visual reflectance obtained by quantifying reflectance that a human being senses visually, thereby to change the grayscale of skin tones. Since the visual reflectance expresses brightness (luminance) that is not expressed by the CIE chromaticity diagram, only the visual reflectance is changed without changing the CIE chromaticity coordinates of the colors of the divider plate 141 and the divider plate 142. In a case of obtaining a dark skin tone having low diffuse reflectance, a skin tone having low visual reflectance is used, and in a case of obtaining a light skin tone having high diffuse reflectance, a skin tone having high visual reflectance is used.

By changing the grayscale of colors of the divider plates 141 and 142 or visual reflectance, and changing the pitch of irregularities of the surfaces of the divider plates 141 and 142, the diffuse reflectance of the divider part 140 is made different between the front side (in the +Z direction) and the back side (in the −Z direction) of the beam splitter 122. This allows the user to naturally see the divider plate 141 and the divider plate 142, which improves display quality.

Figure 9:
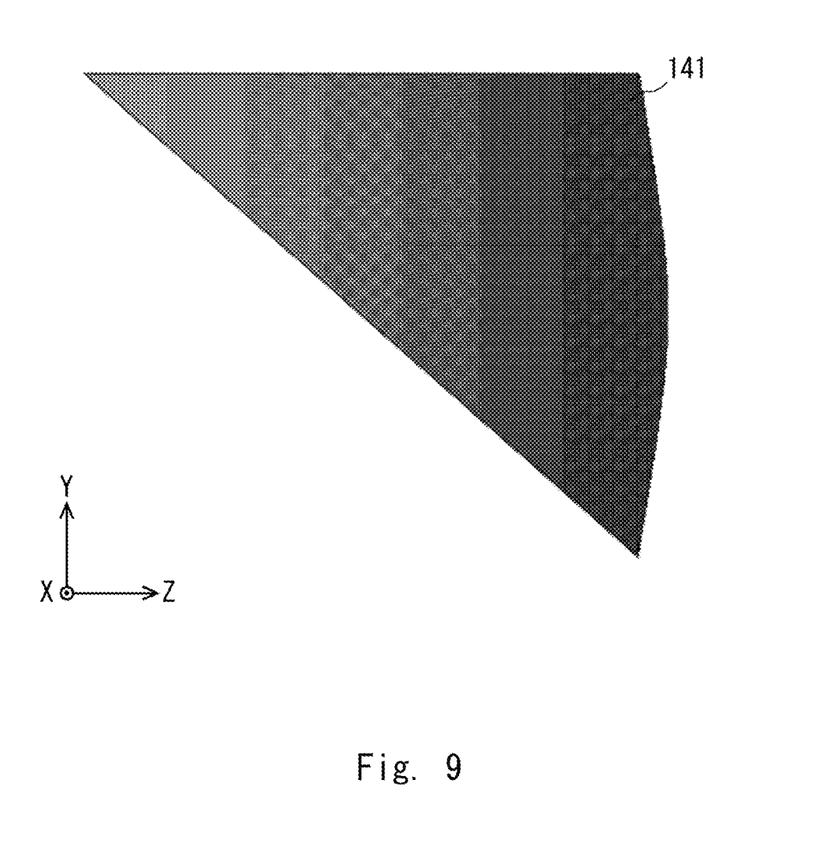
FIG. 9 is a side view showing a spatial distribution of diffuse reflectance of a divider plate.

Further, a spatial distribution of diffuse reflectance may be provided in the divider plate 141. As shown in FIG. 9, for example, the diffuse reflectance of the divider plate 141 may be decreased forward (in the +Z direction). FIG. 9 shows that a portion of a darker color has lower diffuse reflectance and a portion of a lighter color has higher diffuse reflectance. Alternatively, the diffuse reflectance of the divider plate 141 may be increased forward (in the +Z direction). Further, a spatial distribution of diffuse reflectance may be provided in the divider plate 141 in the up-down direction (the Y direction). Likewise, a spatial distribution of diffuse reflectance may be provided in the divider plate 142. In other words, spatial distributions are provided for the diffuse reflectances of the divider plates 141 and 142 in such a way that the divider part 140 is not displayed with emphasis.

Note that also in the structure of the first embodiment, the divider part 140 may be separated into a plurality of regions, and the respective regions may be different in diffuse reflectance. For example, the diffuse reflectance of the diffuse reflection plate to be the divider part 140 may be changed between a region in front (in +Z direction) of the beam splitters 122L and 122R and a region behind (in the −Z direction) the beam splitters 122L and 122R. The region behind (in the −Z direction) the beam splitters 122L and 122R of the divider part 140 may have diffuse reflectance lower than the diffuse reflectance of the region in front (in +Z direction) of the beam splitters 122L and 122R of the divider part 140. For example, by changing the grayscale of the divider part 140 per region, diffuse reflectance has a desired distribution.

Third Embodiment

Figure 10:
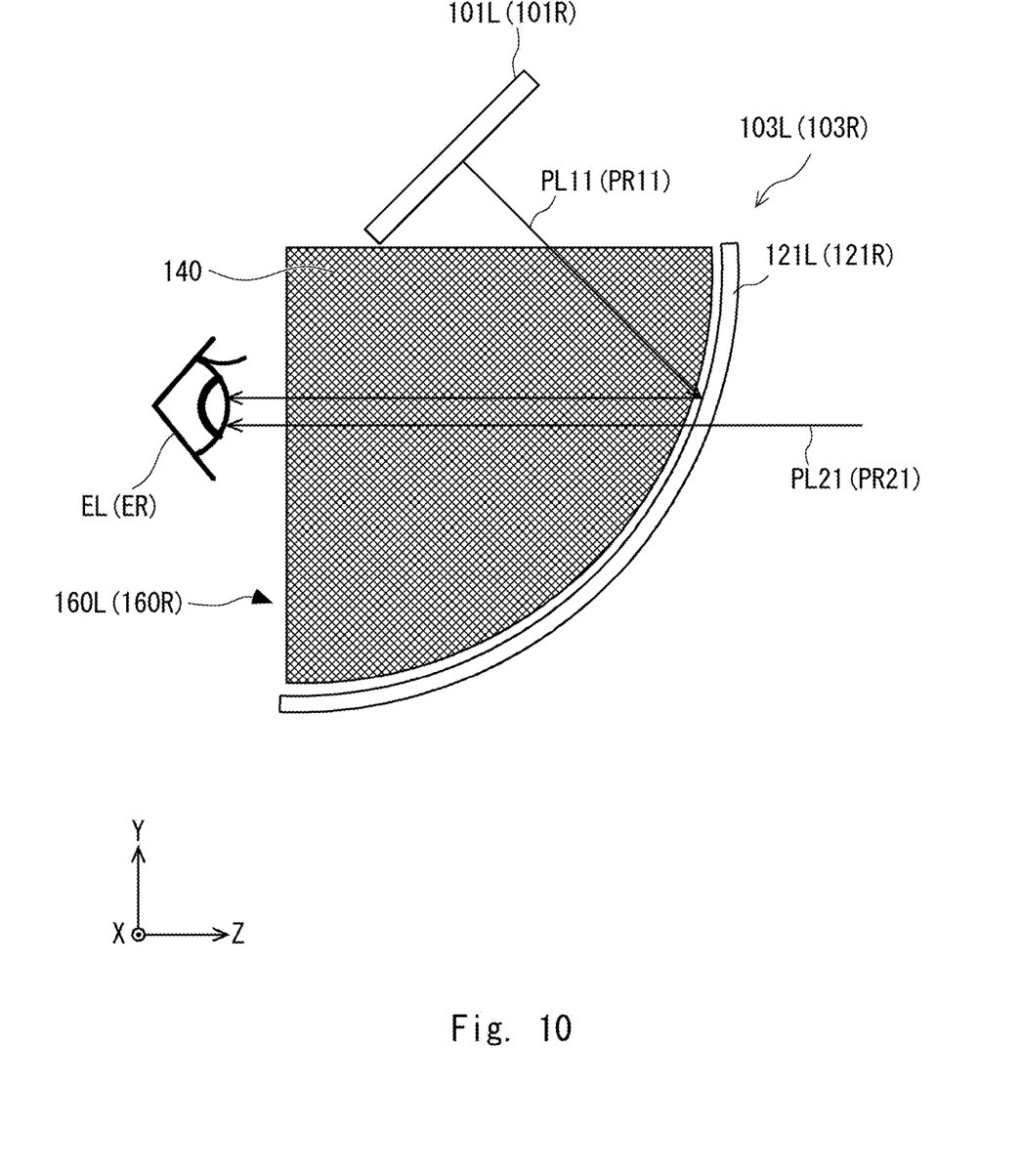
FIG. 10 is a side view schematically showing the structure of an optical system of a head-mounted display according to a third embodiment.

The head-mounted display 100 according to a third embodiment is described with reference to FIG. 10. FIG. 10 is a side view schematically showing the structure of the head-mounted display 100. In this embodiment, the head-mounted display 100 is of the single mirror type unlike the first and second embodiments. In other words, neither the beam splitter 122L nor the beam splitter 122 is provided between the left eye EL and the combiner 121L.

The angle at which the left-eye display element 101L is located is different from that in the first and second embodiments. The left-eye display element 101L is arranged diagonally. In other words, the display surface of the left-eye display element 101L faces downward (in the −Y direction) and forward (in the +Z direction). The display light PL11 from the left-eye display element 101L is output in the −Y direction and the +Z direction. The combiner 121L is arranged below (in the −Y direction) the left-eye display element 101L. The combiner 121L transmits half of light, and reflects the remaining half.

The combiner 121L reflects the display light PL11 from the left-eye display element 101L toward the left eye EL. The combiner 121L is a concave half mirror, and reflects the display light PL11 so as to focus the display light PL11 toward the left eye EL. The left-eye optical system 103L guides the display light from the left-eye display element 101L to the left eye EL. The optical system allows a virtual image to be displayed in front (in the +Z direction) of the user.

Further, the outside light PL21 passes through the combiner 121L and enters the left eye EL. The transmittance of the combiner 121L is 50%. Thus, the outside light PL21 is attenuated to 50% by passing through the combiner 121L. Then, the outside light PL21 that has been attenuated to 50% enters the left eye EL. This allows a display image to be superimposed on a view in the front (in the +Z direction). Further, since the combiner 121L extends to a place immediately below the left-eye display element 101L in this embodiment, the light shielding part 150L is not provided.

The divider part 140 is arranged between the left front space 160L and the right front space 160R. This improves display quality similarly to the first and second embodiments. Further, since the beam splitter 122 is not provided in FIG. 10, a single diffuse reflection plate can be used as the divider part 140 similarly to the first embodiment.

Note that although the head-mounted display 100 is described as an optical see-through head-mounted display, the head-mounted display 100 may be a non-transmissive head-mounted display. In the case of a non-transmissive head-mounted display, reflective mirrors are provided instead of the combiners 121L and 121R. In other words, a reflective member arranged in front of the beam splitter 122 may be a beam splitter such as a half mirror, or may be a reflective mirror. The reflective member reflects display light toward the user.

Although the embodiments of the invention made by the present inventors are described in the foregoing, the present invention is not restricted to the above-described embodiments, and various changes and modifications may be made without departing from the scope of the invention. Two or more of the above-described embodiments may be combined as appropriate.

The present disclosure is applicable to a head-mounted display.

What is claimed is:
1. A head-mounted display comprising:
a reflective member arranged in front of a user, and configured to reflect display light for forming a display image toward the user;
a beam splitter arranged between the reflective member and eyes of the user across a space in front of a left eye and a space in front of a right eye, and configured to reflect the display light toward the reflective member and transmit the display light that has been reflected by the reflective member; and a divider part arranged between the space in front of the left eye of the user and the space in front of the right eye, and configured to diffusely reflect the display light, wherein the divider part includes a first divider plate arranged in front of the beam splitter and a second divider plate arranged behind the beam splitter.

2. The head-mounted display according to claim 1, wherein the divider part is different in diffuse reflectance in front of and behind the beam splitter.

3. A head-mounted display comprising:
a reflective member arranged in front of a user, and configured to reflect display light for forming a display image toward the user;
a beam splitter arranged between the reflective member and eyes of the user, and configured to reflect the display light toward the reflective member and transmit the display light that has been reflected by the reflective member; and
a divider part arranged between a space in front of a left eye of the user and a space in front of a right eye, and configured to diffusely reflect the display light, wherein the divider part is different in diffuse reflectance in front of and behind the beam splitter.

4. The head-mounted display according to claim 2, wherein the diffuse reflectance of the divider part behind the beam splitter is higher than the diffuse reflectance of the divider part in front of the beam splitter.

5. The head-mounted display according to claim 3, wherein the diffuse reflectance of the divider part behind the beam splitter is higher than the diffuse reflectance of the divider part in front of the beam splitter.

6. The head-mounted display according to claim 1, wherein the divider part is gray or has a skin color of the user.

7. The head-mounted display according to claim 3, wherein the divider part is gray or has a skin color of the user.

* * * * *